(12) United States Patent
Garcia

(10) Patent No.: US 7,369,922 B2
(45) Date of Patent: May 6, 2008

(54) DISTRIBUTED ARCHITECTURE FOR A SYSTEM FOR MANAGING AIRCRAFT LANDING GEAR

(75) Inventor: Jean-Pierre Garcia, Colomiers (FR)

(73) Assignee: Messier-Bugatti, Velizy Villacoublay (FR)

( * ) Notice: Subject to any disclaimer, the term of this patent is extended or adjusted under 35 U.S.C. 154(b) by 258 days.

(21) Appl. No.: 11/206,776

(22) Filed: Aug. 19, 2005

(65) Prior Publication Data

US 2006/0293805 A1   Dec. 28, 2006

(30) Foreign Application Priority Data

Jun. 27, 2005   (FR) .................................. 05 06498

(51) Int. Cl.
*B60T 8/17* (2006.01)
(52) U.S. Cl. .......................................... 701/16; 244/50
(58) Field of Classification Search .................. 701/16; 244/50, 102 SL, 75.1, 183, 184, 194, 81, 244/227
See application file for complete search history.

(56) References Cited

U.S. PATENT DOCUMENTS

| | | | |
|---|---|---|---|
| 2,612,331 A | | 9/1952 | Frazier et al. |
| 3,904,153 A | * | 9/1975 | Watts ........................... 244/50 |
| 4,228,975 A | * | 10/1980 | Sealey ..................... 244/102 R |
| 5,002,143 A | * | 3/1991 | Bernard et al. ............. 180/432 |
| 5,482,228 A | * | 1/1996 | Hoshino ...................... 244/50 |
| 6,390,571 B1 | | 5/2002 | Murphy |
| 6,471,015 B1 | * | 10/2002 | Ralea et al. ............. 188/1.11 L |
| 6,755,375 B2 | * | 6/2004 | Trikha ....................... 244/99.4 |
| 2003/0111895 A1 | | 6/2003 | Salamat et al. |
| 2004/0239173 A1 | | 12/2004 | Williams |
| 2005/0082427 A1 | | 4/2005 | Seung |
| 2006/0049309 A1 | * | 3/2006 | Hershberger et al. ... 244/102 R |

FOREIGN PATENT DOCUMENTS

| | | |
|---|---|---|
| EP | 1 310 848 A1 | 5/2003 |
| EP | 1 484 244 A1 | 12/2004 |

* cited by examiner

*Primary Examiner*—Dalena Tran
(74) *Attorney, Agent, or Firm*—Sughrue Mion, PLLC

(57) ABSTRACT

The invention relates to a system architecture for managing aircraft landing gear and suitable for extending/retracting retractable undercarriages, steering steerable wheels, and braking braked wheels. According to the invention, the architecture comprises a communications network having connected thereto extension/retraction actuators, steering actuators, and braking actuators, together with one or more control units adapted to control all of the actuators connected thereto, the communications network having transmission characteristics that are adapted to enabling the control unit(s) to implement antilock servo-control for controlling the braking actuators.

10 Claims, 2 Drawing Sheets

DISTRIBUTED ARCHITECTURE FOR A SYSTEM FOR MANAGING AIRCRAFT LANDING GEAR

BACKGROUND OF THE INVENTION

In general, aircraft landing gear is retractable, and for this purpose includes driving actuators (hydraulic actuators, electrical actuators, locking hooks, . . . ) which control extension and retraction of undercarriages and also of doors for the wells that receive the undercarriages when retracted. An airplane carries various position sensors adapted to identify the positions of the undercarriages and of the doors, with information therefrom serving to implement determined logic for extending or retracting landing gear that is initiated in response to a pilot order.

The undercarriages of an airplane, and in particular the nose wheel, also include moving parts adapted to enable the wheels to be steered to enable the airplane to be moved on the ground. To this end, the airplane has steering actuators (hydraulic actuator, electric motor, . . . ) adapted to steer the steerable wheels. The airplane also has various sensors (for sensing wheel angular position, speed, . . . ) delivering information used for implementing steering servo-control for steering the wheels in response to a steering instruction from the pilot.

The undercarriages of an airplane also carry brakes which comprise braking actuators (hydraulic pistons, pushers controlled by electric motors, . . . ) for selectively applying braking force on friction disks adapted to slow rotation of the wheels. The airplane carries various sensors (speed of wheel rotation, braking intensity, . . . ) delivering information that is used for implementing braking servo-control adapted to apply a given braking force to the wheels in response to a braking instruction from the pilot. The servo-control includes an antilock function for relaxing the braking force on a wheel if it begins to skid.

Those various actuators are controlled by a landing gear management system.

In a known architecture for a landing gear management system, the management system has a braking computer (generally including an active channel and a monitoring channel) for controlling the braking actuator, a steering computer for controlling the steering actuator, and a maneuvering computer for controlling the extension and retraction actuators. Each of the computers is connected via simple point-to-point links to the sensors needed for implementing the associated function, one of the computers possibly being connected to another computer in order to provide it with some particular information, such as, for example, an indication that it is working or not working.

That type of architecture requires a large number of cables, and it requires any computers that manage critical functions, such as braking, to be duplicated.

Another example of known prior art, e.g. as used for the A380, is known as integrated modular avionics. The functions of steering and of maneuvering the landing gear are integrated in central computers of the airplane which are in communication with data concentrators via one-way communications buses of the ARINC 429 type. The computers are connected to one another via an asynchronous both-way bus of the AFDX type enabling data to be transferred between computers. However braking, and particularly antilock servo-control, continues to be performed by a specific computer not integrated in the central computers of the airplane and located remotely so as to be in the vicinity of the brakes in order to be in direct communication with the associated sensors.

That architecture remains non-uniform with specific computers located in unsecure locations on the airplane and requiring local connections that are not integrated in the communications network.

In the automotive field, braking architectures are known in the form of synchronous communications networks in which a control unit integrating antilock servo-control controls braking actuators connected to the synchronous communications network, with sensors associated with the brakes also being connected to the communications networks. The synchronous communications networks that have been described (e.g. of the TTP type or the FLEXRAY type) present a transmission speed and a method of managing transmissions that are compatible with the speed and stability required for antilock servo-control.

OBJECT OF THE INVENTION

The object of the invention is to provide a simplified architecture for managing aircraft landing gear.

BRIEF DESCRIPTION OF THE INVENTION

In order to achieve this object, the invention provides a system architecture for managing aircraft landing gear and suitable for performing at least one of the functions selected from:
  retracting/extending retractable undercarriages by means of retraction/extension actuators and retraction/extension information coming from associated sensors;
  steering steerable wheels carried by at least one of the undercarriages by means of steering actuators and steering information coming from associated sensors;
  the architecture being suitable also for braking braked wheels carried by at least one of the undercarriages by means of braking actuators and braking information coming from associated sensors;
  the architecture comprising at least one communications network having connected thereto:
    at least a fraction of the retraction/extension actuators, and/or of the steering actuators, and the sensors associated with said actuators; and
    one or more control units suitable for controlling the retraction/extension actuators, and/or the steering actuators connected to the communications network as a function of information delivered by the associated sensors;
  in which, according to the invention, at least a fraction of the braking actuators and the sensors associated with said actuators are connected to the communications network, the control unit(s) being adapted to control the braking actuators connected to the communications network as a function of information delivered by the associated sensors, the communications network having transmission characteristics adapted to enabling the control unit(s) to implement antilock servo-control for controlling the braking actuators.

Thus, a single network is used to perform the braking function, in addition to other functions (extending/retracting, steering), with the braking function being performed by using a suitable communications network that enables all three functions to be implemented on the same communications network. This disposition makes possible considerable simplification of the architecture for managing landing gear.

BRIEF DESCRIPTION OF THE DRAWINGS

The invention will be better understood in the light of the following description given with reference to the figures, in which.

DETAILED DESCRIPTION OF THE INVENTION

Figure 1:
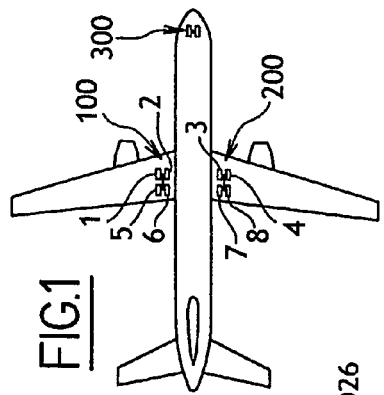
FIG. 1 shows a commercial airplane with eight braked wheels.

The airplane shown diagrammatically in FIG. 1 is a conventional commercial airplane having a port main undercarriage 100, a starboard main undercarriage 200, and a nose undercarriage 300.

The port main undercarriage 100 carries four braked wheels fitted with brakes or braking actuators respectively referenced 1, 2, 5, and 6, while the starboard main undercarriage 200 carries four braked wheels fitted with brakes or braking actuators respectively referenced 3, 4, 7, and 8.

Figure 2B:
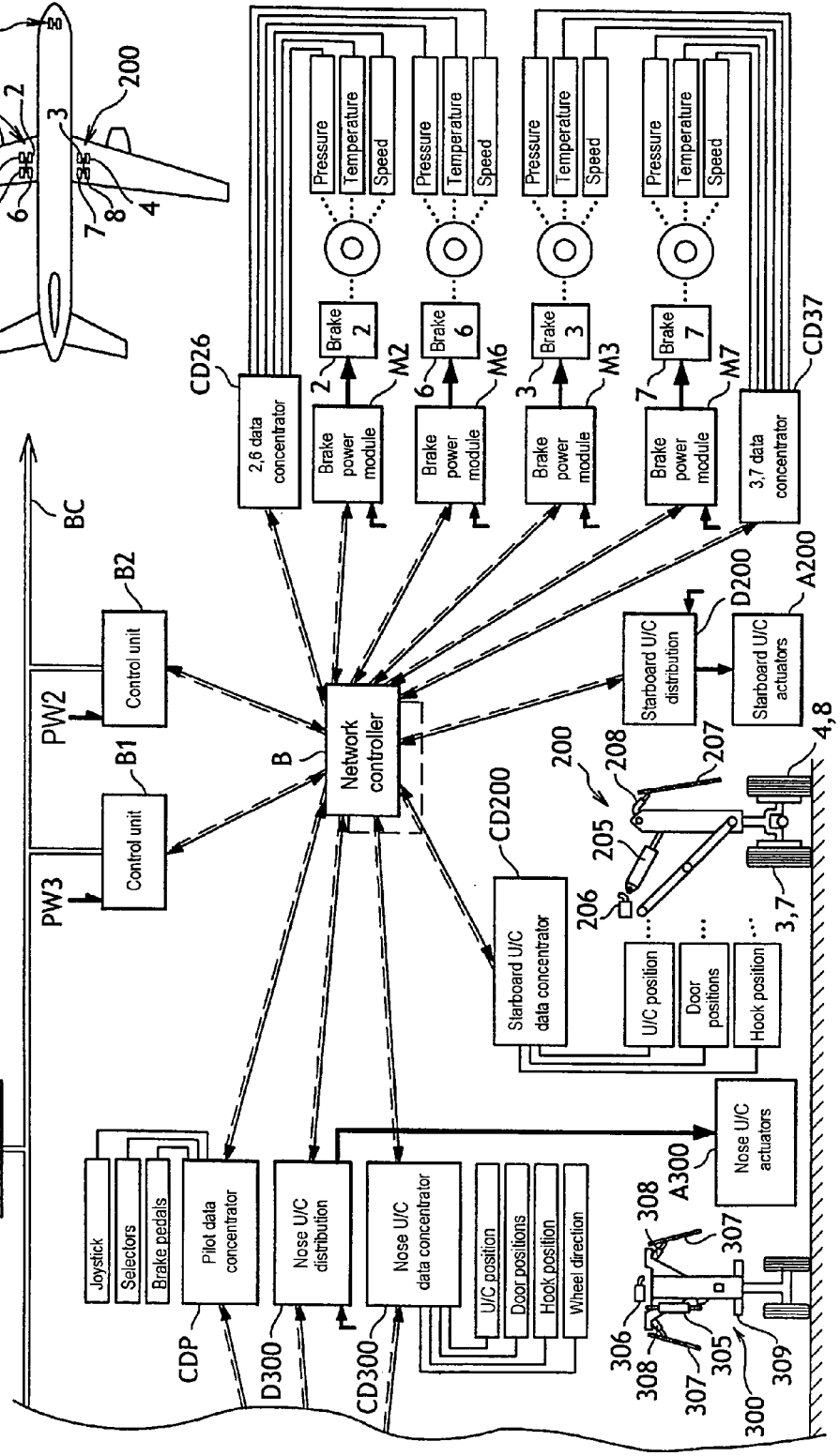
FIGS. 2A and 2B together constitute a single diagram of an architecture of the invention which is spread over two figures because of its size. The figures overlap, each including the central portion of the diagram showing the nose wheel.
Figure 2A:
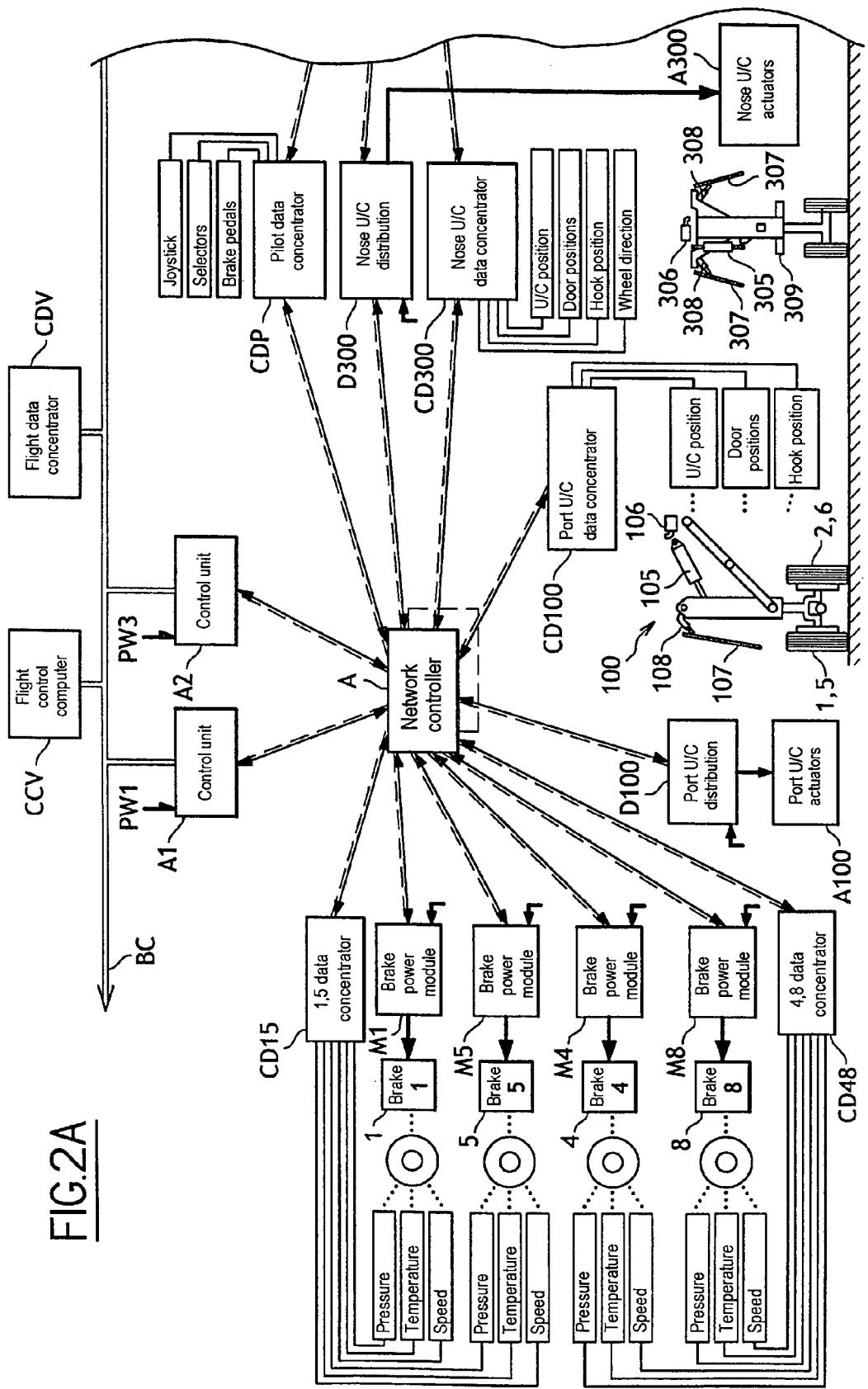

The architecture of the invention is described in detail below with reference to FIGS. 2A and 2B taken together.

The port main undercarriage 100 is associated for retraction and extension with a raising actuator 105 and a locking hook 106. Doors 107 driven by actuators 108 open and close a well for receiving the port main undercarriage 100.

Likewise, the starboard main undercarriage 200 is associated for retraction and extension purposes with a raising actuator 205 and with a locking hook 206. Doors 207 driven by actuators 208 open and close the well for receiving the starboard main undercarriage 200.

Finally, the nose undercarriage 300 is associated for retraction and extension purposes with a raising actuator 305 and with locking hooks 306. Doors 307 driven by actuators 308 open and close the well for receiving the nose undercarriage 300. The nose undercarriage 300 further comprises a steering member 309 (e.g. a rack actuator) for swiveling the wheels carried by said undercarriage in order to steer the airplane on the ground.

Each of the brakes 1, 2, . . . , 8 is associated with a corresponding power module M1, M2, . . . , M8 for transmitting power proportional to a braking instruction to the associated brake. With hydraulic brakes, the power module is a servo-valve adapted to transmit pressure to the brake that is proportional to an electrical braking instruction. With electromechanical brakes, the power module is a converter adapted to transmit power current to the brake proportional to an electrical braking instruction.

Similarly, each of the actuators of an undercarriage is associated with a member for distributing power so as to feed the actuators in response to actuation orders. In the architecture, the actuators are symbolically grouped together in boxes labeled "port U/C actuators", "starboard U/C actuators", and "nose U/C actuators", respectively referenced A100, A200, and A300. The corresponding power distribution members are referenced D100, D200, and D300.

With hydraulic actuators, the distribution member comprises a set of valves under electrical control enabling the actuators to be connected selectively to a pressure source of the airplane. With electrical actuators, the distribution member comprises electrically-controlled switches enabling the actuators to be connected selectively to an electricity source of the airplane.

The bold arrows symbolize the flows of power towards the brakes and towards the actuators.

The architecture of the invention shown herein serves to manage all of the functions associated with the undercarriages: braking, retraction/extension, and steering, by acting on the various actuators associated with the undercarriages.

To do this, the architecture of the invention makes use of a first star communications network A and a second star communications network B, where the references A and B are used below to designate either the communications network itself or the associated network controller, which can be seen in the figures in the center of the corresponding communications network.

The network controller A is connected:

to the power modules M1 and M5 of the outer brakes 1 and 5 of the port main undercarriage 100;

to the power modules M4 and M8 of the outer brakes 4 and 8 of the starboard main undercarriage 200;

to the distribution member D100 associated with the retraction/extension actuators A100 of the port main undercarriage 100; and to the distribution member D300 associated with the retraction/extension and steering actuators A300 of the nose undercarriage 300.

The network controller A is also connected to two control units A1 and A2 that are suitable for generating instructions or orders for the power modules and the distribution members connected to the network controller A. The two control units are continuously active, one of the control units generating instructions and orders, while being monitored by the other control unit.

The control units A1 and A2 are thus suitable for managing:

braking by means of the brakes 1, 5, 4, and 8;

retracting/extending the port main undercarriage 100 and the nose undercarriage 30; and steering the wheels of the nose undercarriage 300.

To do this, the control units A1 and A2 receive information from data concentrators also connected to the communications network A:

a data concentrator CD15 which receives and shapes electrical information such as the pressures in the tires of the wheels 1 and 5, the temperatures of the brakes 1 and 5, the speeds of rotation of the wheels 1 and 5, this information coming from sensors associated with the brakes 1 and 5;

a data concentrator CD48 which receives and shapes electrical information such as the pressures in the tires on the wheels 4 and 8, the temperatures of the brakes 4 and 8, the speeds of rotation of the wheels 4 and 8, this information coming from sensors associated with the brakes 4 and 8;

a data concentrator CD100 of the port main undercarriage 100 which receives and shapes information concerning the position of the undercarriage (contraction of the damper, angular position of the rocker beam carrying the wheels, . . . ) or state information associated with retracting/extending the undercarriage, e.g. concerning doors (open/closed), locking hooks (locked, unlocked);

a data concentrator CD300 of the nose undercarriage 300 which receives and shapes information concerning the position of the nose undercarriage (contraction of the damper, angular position of the rocker beam carrying the wheels, . . . ) or state information associated with retracting/extending the undercarriage, e.g. concerning doors (open/closed), locking hooks (locked/unlocked), and also information concerning the angular position of the wheels of the nose undercarriage; and a pilot data concentrator CDP which receives and shapes signals coming from the brake pedals, various switches on the steering wheels or control sticks actuated by the pilot or the co-pilot (in a variant separate data concentrators could be provided for the pilot and for the co-pilot).

The architecture of the invention comprises a second star communications network B comprising a network controller which is connected:

to the power modules M2 and M6 for the inner brakes 2 and 6 of the port main undercarriage 100;

to the power modules M3 and M7 for the inner brakes 3 and 7 of the starboard main undercarriage 200;

to the distribution member D200 associated with the retraction/extension actuators A200 of the starboard main undercarriage 200; and to the distribution member D300 associated with the retraction/extension actuators A300 of the nose undercarriage 300.

The network controller B is also connected to two control units B1 and B2 which are suitable for generating instructions or orders for the power modules and the distribution members connected to the network controller B. The two control units are continuously active, one of the control units generating the instructions and orders under monitoring by the other control unit.

The control units B1 and B2 are therefore suitable for managing:

braking of the brakes 2, 3, 6, and 7;

retracting/extending the starboard main undercarriage 200 and the nose undercarriage 300; and steering the wheels of the nose undercarriage 300.

To do this, the control units B1 and B2 receive information from data concentrators also connected to the communications network B:

a data concentrator CD26 which receives and shapes electrical information such as the pressures in the tires on the wheels 2 and 6, the temperatures of the brakes 2 and 6, the speeds of rotation of the wheels 2 and 6, this information coming from sensors associated with the brakes 2 and 6;

a data concentrator CD37 which receives and shapes electrical information such as the pressures in the tires on the wheels 3 and 7, the temperatures of the brakes 3 and 7, the speeds of rotation of the wheels 3 and 7, this information coming from sensors associated with the brakes 3 and 7;

a data concentration CD200 for the starboard main undercarriage 200 which receives and shapes information concerning the position of the undercarriage (contraction of the shock absorber, angular position of the rocker beam carrying the wheels, . . . ), or state information associated with retracting/extending the undercarriage, e.g. concerning doors (open/close), locking hooks (locked/unlocked);

the data concentrator CD300 of the nose undercarriage 300; and the pilot data concentrator CDP.

According to an essential aspect of the invention, the communications networks A and B are of the synchronous type. Thus, each of the subscribers to the communications networks communicates information in compliance with a predetermined scheme managed by the corresponding network controller, this information being made available by the network controller to all of the other subscribers. Synchronous management, by eliminating conflicts of access to the communications network, thus makes it possible to ensure that information is transmitted deterministically, and thus guarantees an extremely short maximum transmission time (of the order of a few milliseconds) that is compatible with the control unit implementing antilock servo-control. The braking electronics can thus be placed in the control unit, and can thus be sheltered in a secure zone of the airplane. This makes it pointless to provide specific computers that are located remotely for implementing the antilock function.

The braking function is thus performed in the invention by the same units as are used for performing the retraction/extension function and the steering function.

The architecture of the invention presents numerous other advantages over prior art architectures:

the control units A1, A2, B1, and B2 are all identical: they have the same inputs/outputs, the same electronics cards, and they are all suitable for performing the same functions, thereby greatly reducing their cost of manufacture;

the control units monitor one another within a given communications network so there is no point in providing each of the control units with an active channel and a monitoring channel, thereby further reducing the cost of manufacturing the control units; in the event of one of the units failing, the other control unit is adapted to take over from the failed control unit and perform all of the functions that were being provided by the failed control unit;

certifying the architecture becomes very simple, since the deterministic nature of the synchronous communications network makes it possible to enumerate exactly (and thus to test) all of the possible situations that might arise in operation of the communications network; this simplicity inherent to using synchronous communications networks enables the safety of the architecture of the invention to be increased, and also makes it possible to reduce considerably the time and cost of obtaining certification; and the use of star communications networks makes it possible to further increase the safety of the architecture of the invention. The loss of one link between one of the network controllers and one of the subscribers to that controller does not undermine the entire communications network, but only the link in question; the remainder of the communications network can continue to operate; for example, the loss of the data concentrator CD100 of the port main undercarriage 100 interferes with retracting/extending the port main undercarriage 100 but does not undermine the other functions such as braking or steering the wheels of the nose undercarriage.

Preferably, the communications networks A and B are redundant. In the figures, this redundancy is symbolized by pairs of arrows (a continuous line arrow and a dashed line arrow) representing the two connections between the network controllers and the corresponding subscribers. Redundancy considerably reinforces the safety of the architecture of the invention. In each of the subscribers, it is possible to organize a safety check by verifying that the information received from the controller and conveyed by the two redundant channels of the connection between the controller and the subscriber in question is indeed identical.

Also preferably, the network controllers A and B implement a secure communications protocol that performs tasks of verifying the coherence of data transiting through the communications networks, e.g. by systematically sending the data for sending three times over and verifying that all three versions are identical. Verifying data coherence by means of the network controller serves to off-load these aspects of verification from the control units, thereby further simplifying their design. The control units are therefore spared the tasks of verifying the coherence of the data transmitted by the communications networks, thus further simplifying the control units.

The star communications networks are preferably of the time-triggered protocol (TTP) type, i.e. they are communications networks that are synchronous, deterministic, multiplexed, and redundant.

It should be observed that in the event of one of the star communications networks failing, it is still possible to use the other communications network:

- to obtain partial braking on the four braked wheels controlled by the still-working communications network (either the outer wheels 1, 5, 4, and 8, or the inner wheels 2, 6, 3, and 7, this distribution being deliberately selected so that partial braking continues to remain symmetrical);
- to extend the main undercarriage associated with the still-working communications network; and
- to extend the nose undercarriage and to control steering of the wheels of the nose undercarriage.

The main undercarriage under the control of the failed communications network is then extended using conventional emergency means (e.g. under gravity with automatic spring-loaded locking).

The architecture of the invention thus presents a particularly high degree of safety, while being overall much less burdensome to construct and to certify than are existing architectures.

According to a particular aspect of the invention, the control units A1, A2, B1, and B2 are also connected to a communications network BC of the airplane, e.g. a network of the AFDX asynchronous both-way type, to which other systems of the airplane are also connected such as a flight data concentrator CDV (capable of providing information such as outside temperature, airspeed, . . . ) and various computers, including the flight control computers CCV. The bus BC enables the four control units A1, A2, B1, and B2 to dialog with one another, to exchange data, and to monitor one another mutually, thereby further increasing the safety of the architecture of the invention.

In another particular aspect of the invention, the power supply to the architecture of the invention makes use of three power supply buses PW1, PW2, and PW3. The buses PW1 and PW2 are adapted to convey electrical power coming from electrically independent alternators driven by the engines of the airplane. The power supply bus PW3 is suitable, for example, for transmitting electrical power coming from an auxiliary power unit or from a direct current source (such as batteries).

The control unit A1 is preferably powered by the power supply bus PW1, the control unit B2 by the power supply bus PW2, and the control units A2 and B1 by the power supply bus PW3. In the figures, the power supplies to the control units are represented by asymmetrical arrow heads.

Thus, if any one of the power supply buses fails, there remains at least one control unit in each of the communications networks A, B that can perform braking. The failure of one power supply bus therefore does not prevent braking from being controlled.

Preferably, at least one of the network controllers A, B is powered by the power supply bus PW3, so that in the event of the airplane engines failing, it is still possible to provide partial braking with the brakes being controlled by the communications network that is powered by the power supply bus PW3.

Similarly, for each of the communications networks A and B, a fraction of the concentrators connected to the corresponding communications network is preferably powered by one of the power supply buses PW1 or PW2, while the remaining fraction is powered by the power supply bus PW3. Thus, failure of one of the power supply buses does not lead to a loss of all of the information coming from the concentrators.

Preferably, similar segregation is applied to powering the power modules connected to the communications networks A and B.

Segregation implemented in this way at power supply level for all of the subscribers to the communications networks A and B further increases the safety of the architecture of the invention.

The invention is not limited to the description above, but on the contrary covers any variant coming within the ambit defined by the claims.

In particular, although it is stated that the communications networks A and B are synchronous communications networks of the TTP type, it is possible to use other types of (optionally synchronous) communications networks providing they have transmission characteristics (access conflict management, transmission time, . . . ) that are compatible with performing antilock servo-control (i.e. fast servo-control with a very short sampling time, of the order of a few milliseconds).

In addition, communications network topologies could be used other than the star topology.

Although it is stated that the braking data concentrators pick up and shape information such as temperature, pressure, and speed, the concentrators could pick up other information such as brake wear or the force exerted by the brakes. Preferably, information that is critical for implementing the braking function (in particular speed information) is duplicated and made available to the associated communications network via two different concentrators so that in the event of one failing, the other can continue to supply the information.

Although the invention is described in application to an airplane having two main undercarriages with four braked wheels and a nose undercarriage, the invention is not limited to airplanes of this type, and can easily be generalized to an airplane having other configurations of undercarriages, as diverse as those on the A320 or the B737 (two main undercarriages with two braked wheels, one nose undercarriage with steerable wheels), the B777 (two undercarriages with six braked wheels and a steerable rear axle, one nose undercarriage with steerable wheels), or indeed the A380 (two main wing undercarriages having four braked wheels, two main fuselage undercarriages having six braked wheels, one nose undercarriage having steerable wheels).

What is claimed is:

1. A system architecture for managing aircraft landing gear and suitable for performing at least one of the functions selected from:

retracting/extending retractable undercarriages by means of retraction/extension actuators and retraction/extension information coming from associated sensors;

steering steerable wheels carried by at least one of the undercarriages by means of steering actuators and steering information coming from associated sensors;

the architecture being suitable also for braking braked wheels carried by at least one of the undercarriages by means of braking actuators and braking information coming from associated sensors;

the architecture comprising at least one communications network having connected thereto:

at least a fraction of the retraction/extension actuators, and/or of the steering actuators, and the sensors associated with said actuators; and one or more control units suitable for controlling the retraction/extension actuators and/or the steering actuators connected to the communications network as a function of information delivered by the associated sensors;

wherein at least a fraction of the braking actuators and the sensors associated with said actuators are connected to the communications network, the control unit(s) being adapted to control the braking actuators connected to the communications network as a function of information delivered by the associated sensors, the communications network having transmission characteristics adapted to enabling the control unit(s) to implement antilock servo-control for controlling the braking actuators.

2. An architecture according to claim 1, comprising:

a first communications network having a first fraction of the braking actuators connected thereto; and a second communications network having a second fraction of the braking actuators complementary to the first fraction connected thereto;

the first and second fractions being selected in such a manner that in the event of one of the two communications networks failing, partial braking can be performed symmetrically by the fraction of the actuators connected to the other communications network.

3. An architecture according to claim 2, for an airplane having a nose undercarriage, and main undercarriages, in which:

the first communications network is connected to:

the retraction/extension actuators of a first fraction of the main undercarriages and the associated sensors; and the retraction/extension actuators of the nose undercarriage and the associated sensors; and the second communications network is connected to:

the retraction/extension actuators of a second fraction of the main undercarriages complementary to the first fraction, and the associated sensors; and the retraction/extension actuators of the nose undercarriage and the associated sensors.

4. An architecture according to claim 2, in which the control unit(s) connected to the first communications network, and the control unit(s) connected to the second communications network, are interconnected by a third communications network independent of the first two networks.

5. An architecture according to claim 2, in which each of the communications networks is connected to at least four control units, one of the control units of the first communications network being powered by a first power supply bus, one of the control units of the second communications network being powered by a second power supply bus, and the other two control units being powered by a third power supply bus.

6. An architecture according to claim 1, in which the communications network is of the synchronous type.

7. An architecture according to claim 1, in which the communications network is duplicated.

8. An architecture according to claim 1, in which the communications network is a star network.

9. An architecture according to claim 1, in which the communications network possesses a controller suitable for implementing tasks of verifying the coherence of the data transmitted over the communications network.

10. An architecture according to claim 1, in which each of the at least one communications network is an electronic network.

* * * * *